（12）United States Patent
Martins

(10) Patent No.: US 9,623,803 B1
(45) Date of Patent: Apr. 18, 2017

(54) VEHICLE END-GATE WITH STEP ACCESS

(71) Applicant: GM GLOBAL TECHNOLOGY OPERATIONS LLC, Detroit, MI (US)

(72) Inventor: Marcel W. Martins, Campinas (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/994,559

(22) Filed: Jan. 13, 2016

(51) Int. Cl.
*B60R 3/02* (2006.01)
*B62D 33/03* (2006.01)
*B62D 33/04* (2006.01)

(52) U.S. Cl.
CPC ............... *B60R 3/02* (2013.01); *B62D 33/03* (2013.01); *B62D 33/04* (2013.01)

(58) Field of Classification Search
CPC .. B60R 3/00; B60R 3/007; B60R 3/02; B62D 33/023; B62D 33/027; B62D 33/0273; B62D 33/03; B62D 33/04
USPC ...... 280/163, 164.1, 166, 169; 296/50, 57.1, 296/62
See application file for complete search history.

(56) References Cited

U.S. PATENT DOCUMENTS

| 2,991,118 | A | * | 7/1961 | Sleger | ........................ B60R 3/00 |
| | | | | | 182/90 |
| 4,194,754 | A | | 3/1980 | Hightower | |
| 4,846,487 | A | | 7/1989 | Criley | |
| 4,848,821 | A | | 7/1989 | Llewellyn | |
| 5,169,201 | A | * | 12/1992 | Gower | ..................... B60R 13/01 |
| | | | | | 296/39.2 |
| 6,607,232 | B2 | * | 8/2003 | Katulka | ............. B62D 33/0273 |
| | | | | | 296/37.6 |
| 6,964,444 | B2 | | 11/2005 | Chumley et al. | |
| 7,055,838 | B2 | | 6/2006 | Lambie | |
| 7,240,947 | B2 | | 7/2007 | Kuznarik et al. | |
| 8,087,710 | B2 | * | 1/2012 | Zielinsky | ................... B60P 1/26 |
| | | | | | 16/82 |
| 8,348,325 | B2 | * | 1/2013 | Hausler | .............. B62D 33/0273 |
| | | | | | 296/51 |
| 2002/0070577 | A1 | * | 6/2002 | Pool, III | ................... B60R 3/02 |
| | | | | | 296/62 |
| 2010/0025955 | A1 | | 2/2010 | Carr, Jr. | |

* cited by examiner

*Primary Examiner* — John Walters
(74) *Attorney, Agent, or Firm* — Cantor Colburn LLP

(57) ABSTRACT

An end-gate that is moveable from a closed position to an access position to allow access to an interior or storage area of a vehicle, comprises an interior or storage area facing panel and an inwardly extending step feature, formed in the interior or storage area facing panel, defining a stepping surface that allows an operator to step up and through an interior or storage area opening and into the interior or storage area of the vehicle.

18 Claims, 5 Drawing Sheets

VEHICLE END-GATE WITH STEP ACCESS

FIELD OF THE INVENTION

The subject invention relates to a vehicle end-gate assembly and, more particularly, to a vehicle end-gate having integral step access.

BACKGROUND

Vehicles, such as combis, sport-utility vehicles ("SUVs"), pick-up trucks, delivery trucks and other similarly configured vehicles may have end-gate assemblies (tailgates) that open outwardly, typically along a horizontal axis, to allow access to interior and/or storage areas. It is often the case that the end-gate assemblies, when open, present a high, substantially horizontal platform that makes access to the interior and/or storage area of the vehicle (or the vehicle roof in the case of combis and SUVs) difficult for most individuals. Various devices have been presented that purport to aide in providing simplified access, however, the complexity of the solutions often diminish any benefits to be realized. It is desirable to provide a simple, cost-effective solution for vehicles having end-gates that will allow simple, straight-forward, ingress to, and egress from the interior and/or storage areas.

SUMMARY

In an embodiment a vehicle comprises an interior or storage area defined by side-walls, a floor and a storage area opening, an end-gate having an interior or storage area facing panel that is reciprocally mounted within the storage area opening and is moveable from a first, closed state to a second, open state, wherein the interior or storage area facing panel is positioned relatively horizontal with respect to the ground, and is moveable from the second open state to a third, access state. An inwardly extending step feature is formed in the interior or storage area facing panel, defining a stepping surface for ingress to and egress from the interior or storage area of the vehicle.

In another embodiment an end-gate that is moveable from a first, closed state to an access state to allow access to an interior or storage area of a vehicle, comprises an interior or storage area facing panel and an inwardly extending, step feature formed in the interior or storage area facing panel defining a stepping surface for ingress to and egress from the interior or storage area of the vehicle.

In yet another embodiment, In another embodiment an end-gate that is moveable from a first, closed state to an access state to allow access to an interior or storage area of a vehicle, comprises an interior or storage area facing panel and a step feature formed in the interior or storage area facing panel defining a stepping surface for ingress to and egress from the interior or storage area of the vehicle.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of the embodiments, the detailed description referring to the drawings in which.

DESCRIPTION OF THE EMBODIMENTS

Figure 1:
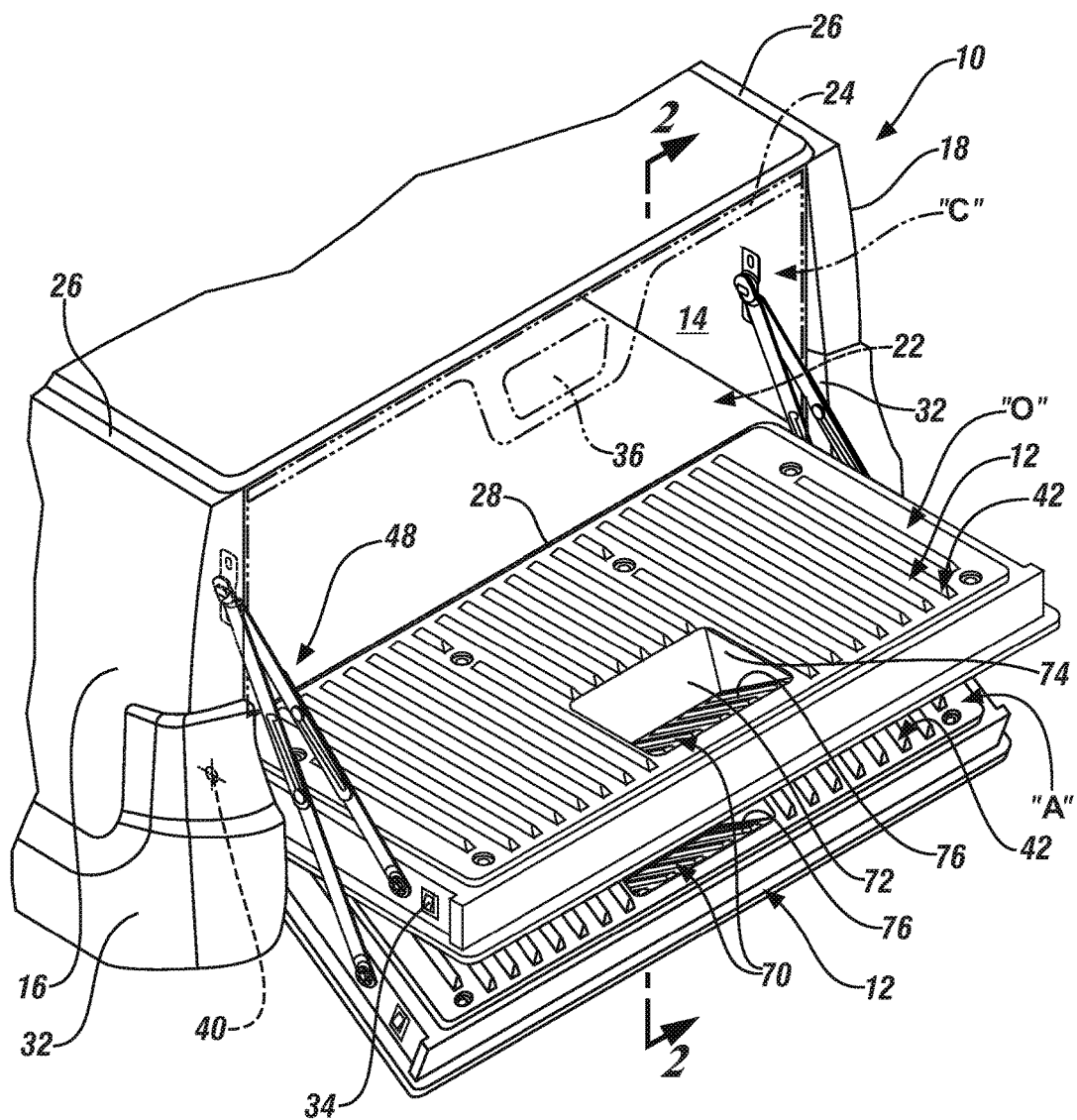
FIG. 1 is a partial perspective view of a vehicle having an end-gate embodying features of the invention.

The following description is merely exemplary in nature and is not intended to limit the disclosure, its application or uses. It should be understood that throughout the drawings, corresponding reference numerals indicate like or corresponding parts or features.

Figure 2:
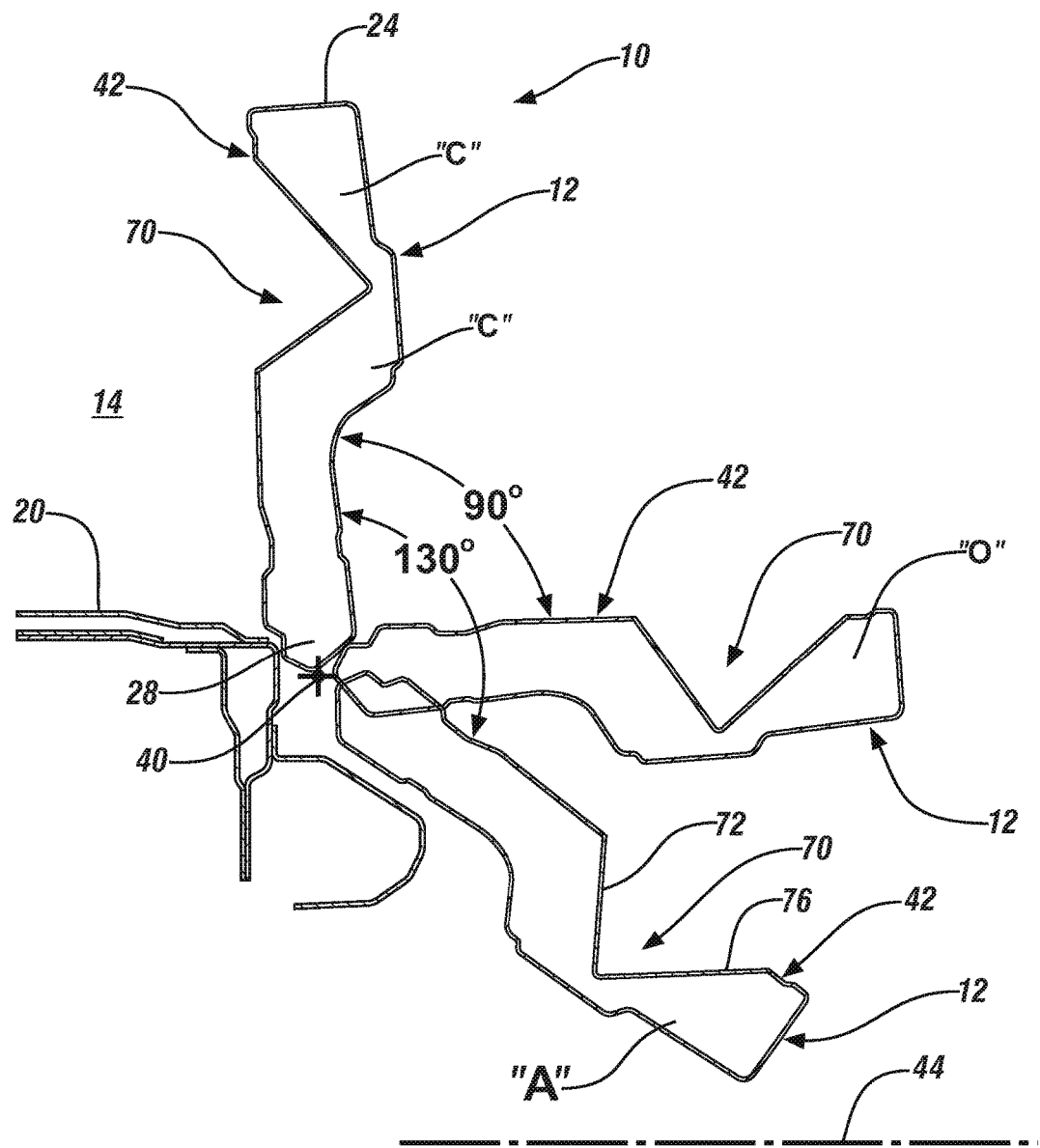
FIG. 2 is a schematic, sectional view taken along line 2-2 of FIG. 1.

In accordance with an embodiment of the invention, FIGS. 1 and 2 illustrate a vehicle 10 having an end-gate 12 that is moveable from a closed position to an opened position to allow access to an interior or storage area 14. In the Figures, the vehicle is illustrated as a pickup truck, however, the term "vehicle" is not limited to such a configuration, with respect to the application of the invention disclosed herein, and may apply equally to an automobile, a truck, a van, and a sport utility vehicle, as well as any self-propelled or towed conveyance suitable for transporting a burden. The interior or storage area 14 is defined by side-walls 16 and 18 and a floor 20. The side-walls 16, 18 and floor 20 typically extend axially, from front to rear, and terminate in a storage area opening 22. Reciprocally mounted within the storage area opening 22 is the end-gate 12. In a closed state "C" the end-gate has a first end 24 that is co-extensive with the upper ends 26 of the side walls 16, 18, and a second end 28 that includes a hinge assembly 30 operable to engage the lower ends 32 of the side walls 16, 18. A latch mechanism 34 operable via an actuator such as handle 36 maintains the end-gate 12 in the closed state "C" or, allows further operation to be described herein.

Figure 3A:
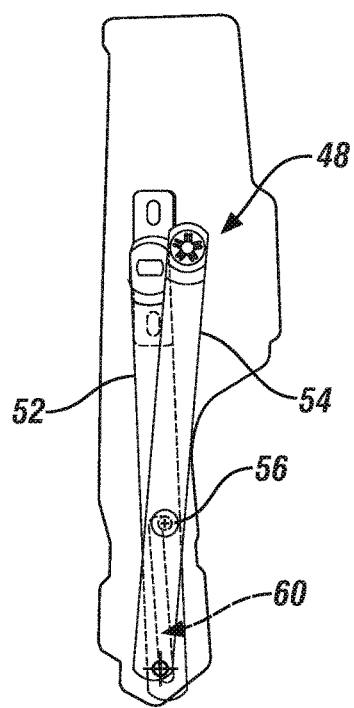
FIGS. 3A, 3B and 3C illustrate a first operation of a linkage assembly embodying features of the invention.
Figure 3B:
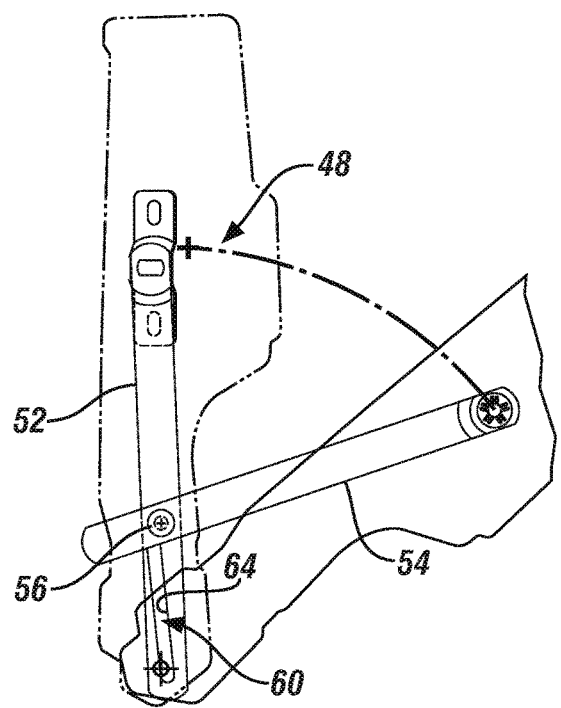
Figure 3C:
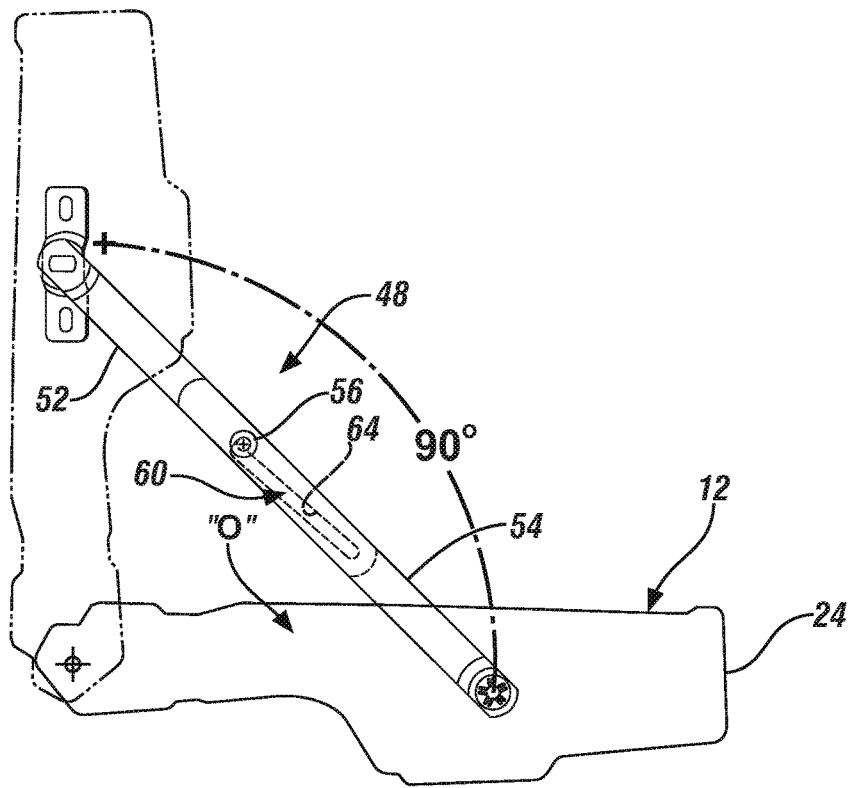
Figure 4A:
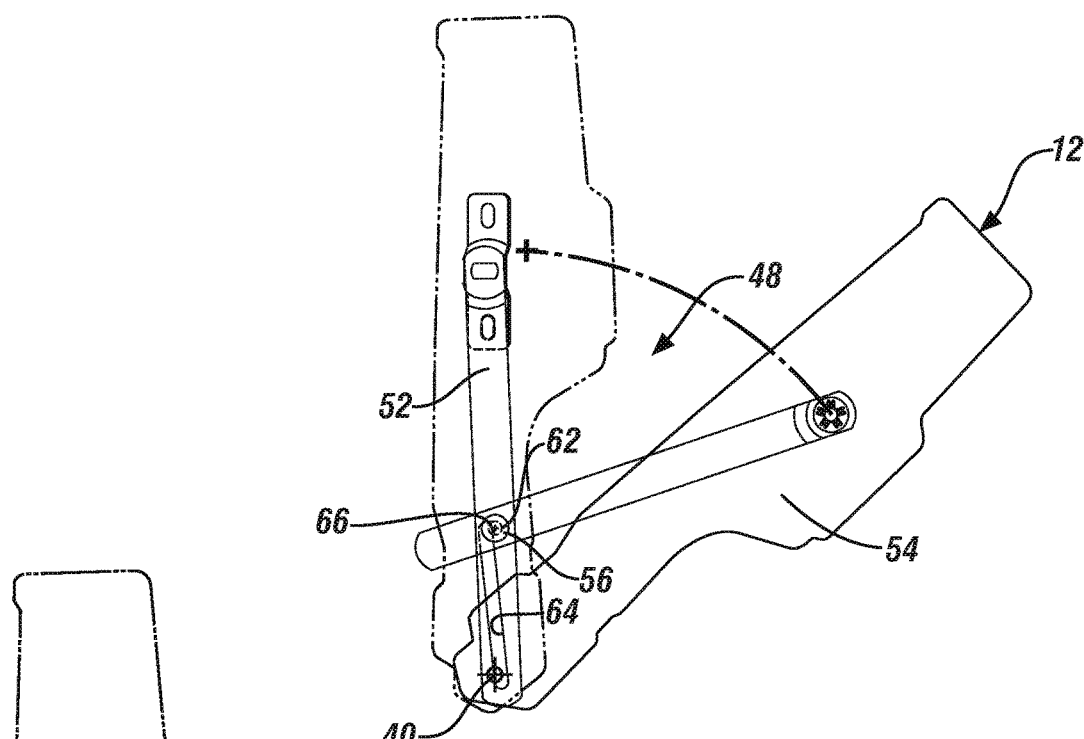
FIGS. 4A and 4B illustrate a second operation of the linkage assembly of FIGS. 3A-3C.
Figure 4B:
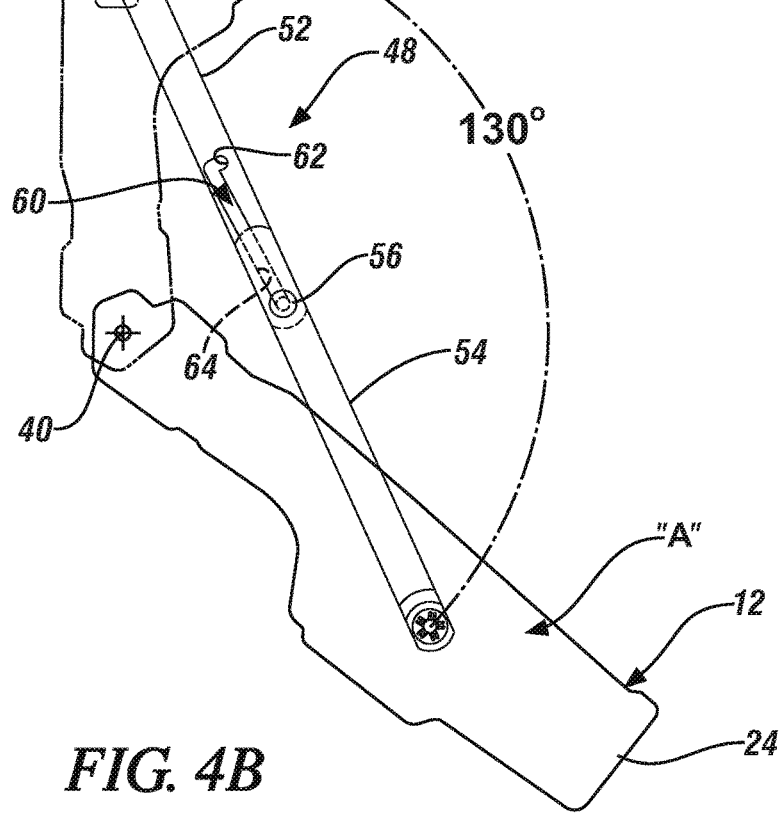

Actuation of the latch mechanism 34 using the handle 36 allows the end-gate 12 to be rotated about the hinge assembly 30 to a first, open state "O". The open state "O" is typical of most pickup truck, and other vehicle end-gates in which the end-gate 12 is rotated about the axis 40 of the hinge assembly 30 approximately 90 degrees such that an interior or storage area facing panel 42 is positioned relatively horizontal with respect to the ground 44. Such position is commonly used to lift and slide items into the interior or storage area 14 through the storage area opening 22. A foldable linkage assembly 48, FIGS. 3A-3C and 4A, 4B, extends between the end-gate 12 and each of the side walls 16, 18. The foldable linkage assemblies 48 may comprise first and second linkages 52 and 54, that are rotatably connected by pin 56, and operate with a fixed length to prevent the end-gate 12 from moving beyond the open state "O", FIG. 3C. In another embodiment, a fixed-length cable having moveable attachment points may be used in place of the foldable linkage assemblies 48. Other embodiments are contemplated.

In certain instances, it may be desirable for an operator to physically access (i.e. stand in) the interior or storage area 14 of the vehicle 10. In an exemplary embodiment, illustrated in FIGS. 4A and 4B, the foldable first linkage 52 may include an extension apparatus such as a secondary track 60 configured to include a locked portion 62 and an extension portion 64. The locked portion and the extension portion of the secondary track 60 are separated by a detent portion 66. The pin 56 is received in the locked portion 62 when the end-gate 12 is in a closed "C" position and in an open "O" position, FIGS. 3B and 3C. If access to the storage area is desired, the first end 24 of the end-gate 12 is pushed upwardly and forward slightly to move the pin 56 around the detent portion 66 and into the extension portion 64. The end-gate 12 may now be rotated about the axis 40 of the hinge assembly 30 approximately 130 degrees to an access "A" state, such that the interior or storage area facing panel 42 is positioned at an approach angle relative to the ground 44, FIG. 2 (i.e. similar to the angle of stairs).

The interior or storage area facing panel 42 of the end-gate 12 may, in an exemplary embodiment, include a step feature 70 having a back portion 72, sides 74 and a rest 76 (i.e. foot rest). The inward angle of the rest 76, relative to the surface of the inner or, bed facing panel 42 complements the opening angle (approximately 130 degrees) of the end-gate and, thereby presents a stepping surface that is relatively horizontal to the ground 44, FIG. 2. The step feature 70 allows an operator to easily step up and through the storage area opening 22 and into the storage area 14 of the vehicle 10 or obtain access to the vehicle roof, in cases where a roof rack is present, without the need to deploy, attach or otherwise add any cumbersome accessory to the vehicle that may add cost, complexity or may take up space in the bed.

Figure 5A:
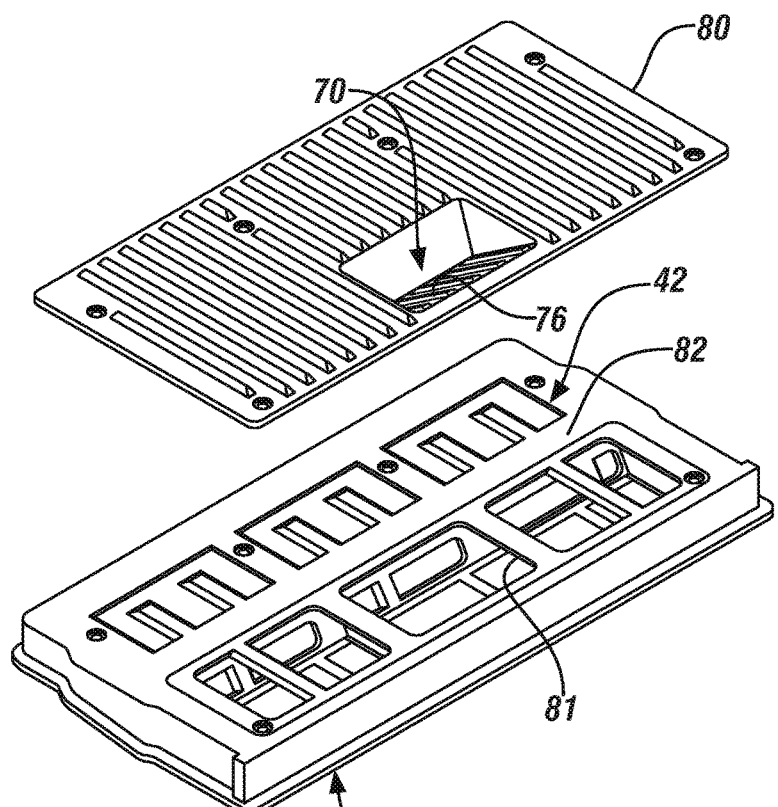
FIGS. 5A and 5B illustrate embodiments of the end-gate of FIG. 1.
Figure 5B:
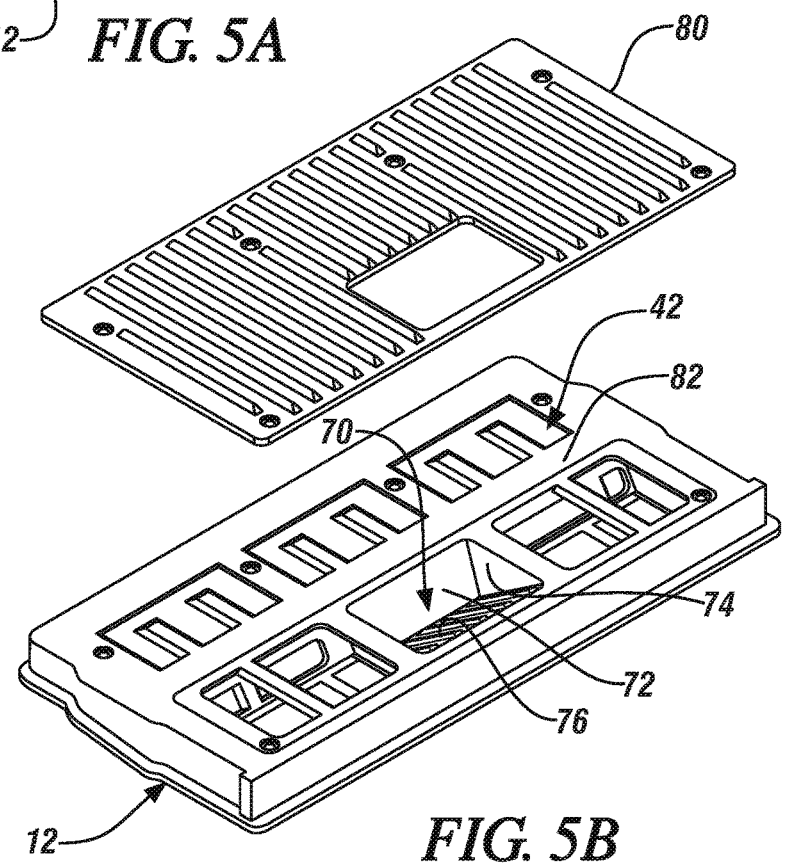

Referring to FIG. 5A, in an embodiment, the inwardly extending, step feature 70 may be integral with an installed storage area liner 80. In such instance, the step feature projects inwardly through an opening 81 in an inner structural panel 82 of the interior or storage area facing panel 42. Such a configuration requires no customization of the vehicle structure to implement. In another embodiment, illustrated in FIG. 5B, the inwardly extending, step feature 70 may be integral with the inner structural panel 82 of the interior or storage area facing panel 42 in cases where a storage area liner is not used or where a stronger step feature 70 is required. While it is likely that a centrally mounted step feature 70 may be preferable from a loading perspective, it is contemplated that the inwardly extending step feature may be located at various locations on the end-gate 12 and that one or more than one step feature may be utilized.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A vehicle comprising:
   a storage area defined by side-walls, and a floor, the storage area including and a storage area an opening;
   an end-gate having a storage area facing panel reciprocally mounted within the opening and moveable from a first, closed state to a second, open state, wherein the storage area facing panel is positioned relatively horizontal with respect to the ground and moveable from the second open state to a third, access state; and
   an inwardly extending step feature integrally formed in the storage area facing panel, the inwardly extending step feature including a stepping surface for ingress to and egress from the storage area of the vehicle.

2. The vehicle of claim 1, the end-gate comprising a hinge assembly operable to engage lower ends of the side walls to facilitate rotation of the end-gate from the first, closed state to the second, open state and the third, access state.

3. The vehicle of claim 2, wherein the second, open state is approximately 90 degrees rotation from the first, closed state and the third, access state is approximately 130 degrees rotation from the first, closed state.

4. The vehicle of claim 2, further comprising a foldable linkage assembly, extending between the end-gate and the side walls, and including a first linkage and a second linkage, rotatably connected to the first linkage by a pin, to thereby define a fixed length that prevents the end-gate from moving beyond the open state.

5. The vehicle of claim 4, further comprising an extension apparatus operable to extend the length of the foldable linkage assembly to facilitate rotation of the end-gate from the second, open state to the third, access state.

6. The vehicle of claim 5, wherein the extension apparatus comprises a secondary track formed in the first linkage, including a locked portion and an extension portion separated from the locked portion by a detent portion, the secondary track configured to receive the pin in the locked portion when the end-gate is in the closed or open position and in the extension portion when the end-gate is in the access position.

7. The vehicle of claim 1, wherein the stepping surface comprises a step feature that includes a back portion, sides and a rest, the inward angle of the rest, relative to the interior or storage area facing panel complementing the access state of approximately 130 degrees rotation from the first, closed state.

8. The vehicle of claim 1, wherein the inwardly extending step feature is integral with a storage area liner.

9. The vehicle of claim 1, wherein the inwardly extending step feature is integral with an inner structural panel of the interior or storage area facing panel.

10. An end-gate that is moveable from a first closed state to an access state to allow access to an interior or storage area of a vehicle, comprising:
    an interior or a storage area facing panel; and
    an inwardly extending step feature integrally formed in the interior or storage area facing panel, the inwardly extending step feature including defining a stepping surface for ingress to and egress from the interior or storage area of the vehicle.

11. The end-gate of claim 10, comprising a hinge assembly operable to engage the vehicle to facilitate rotation of the end-gate from the first, closed state to the access state.

12. The end-gate of claim 11, wherein the access state is approximately 130 degrees rotation from the first, closed state.

13. The end-gate of claim 11, further comprising a foldable linkage assembly, extending between the end-gate and the vehicle, and including a first linkage and a second linkage, rotatably connected to the first linkage by a pin.

14. The end-gate of claim 13, the foldable linkage assembly further comprising an extension apparatus operable to extend the length of the foldable linkage assembly to facilitate rotation of the end-gate to the access state.

15. The end-gate of claim 10, wherein the stepping surface comprises a step feature that includes a back portion, sides and a rest, the inward angle of the rest, relative to the interior facing panel complementing the access state of approximately 130 degrees rotation from the first, closed state.

16. The end-gate of claim 10, wherein the inwardly extending step feature is integral with a storage area liner.

17. The vehicle of claim 10, wherein the inwardly extending step feature is integral with an inner structural panel of the storage area facing panel.

18. An end-gate that is moveable from a first closed state to an access state to allow access to a storage area of a vehicle, comprising:
   a storage area facing panel; and
   a step feature integrally formed in the storage area facing panel, the step feature including defining a stepping surface for ingress to and egress from the storage area of the vehicle.

* * * * *